US005684272A

United States Patent [19]

Gernhardt et al.

[11] Patent Number: 5,684,272

[45] Date of Patent: Nov. 4, 1997

[54] IN-LINE CORD GROUND FAULT CIRCUIT INTERRUPTER

[75] Inventors: Paul Gernhardt, Northport; David Chan, Bellerose; Serge Krzyzanowski, Flushing, all of N.Y.

[73] Assignee: Leviton Manufacturing Co., Inc., Little Neck, N.Y.

[21] Appl. No.: 542,464

[22] Filed: Oct. 23, 1995

Related U.S. Application Data

[63] Continuation of Ser. No. 90,684, Sep. 21, 1993, abandoned, which is a continuation of Ser. No. 12,511, Feb. 16, 1993, abandoned.

[51] Int. Cl.[6] .................... H02G 15/113

[52] U.S. Cl. .................... 174/65 R; 174/77 R; 174/92

[58] Field of Search .................... 174/65 R, 92, 174/93, 77 R, 84 C; 439/98

[56] References Cited

U.S. PATENT DOCUMENTS

| | | | |
|---|---|---|---|
| 3,836,694 | 9/1974 | Kapell | 174/92 X |
| 4,818,822 | 4/1989 | Yahraus | 174/65 R X |
| 5,045,000 | 9/1991 | Trame et al. | 174/92 X |
| 5,124,507 | 6/1992 | Dehling | 174/92 |
| 5,266,740 | 11/1993 | Hsu | 174/92 X |
| 5,306,870 | 4/1994 | Abat | 174/65 R |

*Primary Examiner*—Hyung S. Sough
*Assistant Examiner*—Paramita Ghosh
*Attorney, Agent, or Firm*—Paul J. Sutton

[57] ABSTRACT

An in-line cord ground fault circuit interrupter has a tripping relay whose various components are an integral part of the GFCI housing, instead of being self-contained. The front cover of the housing has the necessary bosses, guide slots, and screw holes for mounting of all the mechanical and electrical elements of the relay. The rear cover serves as a water resistant enclosure and holds the relay elements in position across the width of the housing. The relay's movable contact arms are attached directly to the printed circuit board of the GFCI. The relay armature is located by ribs on the front cover and is trapped in position when the relay coil and frame assembly is pushed over it using guide slots in the front cover. The armature has integral arms extending to each side wherein each arm has an actuating cam on its end. Gripping ribs and strain relief ribs are placed at the cord entrances to the housing with a chamber formed therebetween. The cord grips support the cords while the strain relief prevents forces applied to the cords outside of the enclosure being applied to the joints within the enclosure while a sealant placed in the chambers provides an environmental seal.

6 Claims, 9 Drawing Sheets

IN-LINE CORD GROUND FAULT CIRCUIT INTERRUPTER

BACKGROUND OF THE INVENTION

This application is a continuation of U.S. patent application Ser. No. 08/090,684 filed Sep. 21, 1993, which is a continuation-in-part of U.S. patent application Ser. No. 08/012,511 filed Feb. 16, 1993 both now abandoned.

This invention relates to a ground fault circuit interrupter connected in-line between a line cord and a load cord and comprising therein a tripping relay which is not self-contained, but rather is integrated into the overall ground fault circuit interrupter device. The ground fault circuit is contained in an enclosure which grips the line cord and load cord and provides strain relief as well as environmental seals for both at the enclosure entrances.

There has been a great need for means for detecting when an abnormal current is flowing through line to ground and for immediately interrupting the fault to halt such an abnormal flow to protect people from electric shock, fire, and explosion. As known in the prior art, the "differential" circuit breakers previously utilized in certain European countries have been generally unsatisfactory for such purposes because they have been too insensitive to ensure complete protection to human life. The prior art attempts to solve the aforementioned problem by providing a differential circuit breaker whose current interrupting contacts, in the event of a line to ground short circuit or an abnormal leakage current to ground, are operated by a semiconductor device which in turn is energized by the secondary of a differential transformer through whose core two conductors of the electrical circuit being monitored pass to effectively function as primary windings for the differential transformer.

Known is a ground fault circuit interrupter with an inadvertent ground sensor wherein a circuit breaker connected between a power source having a neutral connector and a phase connector and a load is operated when the differential transformer senses that more current is flowing into the load from the source through the conductors than is flowing back to the source through the conductors. A power transformer is connected across the neutral conductor and a phase conductor and has in its magnetic field a winding for inducing a small voltage between the neutral conductor and ground to sense an inadvertent grounding of the neutral conductor at or near the load. A tertiary winding of the power transformer is connected into the neutral conductor in the vicinity of the load whereby, in the event of a grounding of the neutral conductor in the vicinity of the load, a current is thus induced in the neutral conductor which passes into the ground in the vicinity of the load, and then into the ground for the neutral connector at the power line side of the differential transformer whereupon it passes through the primary of the differential transformer and, if large enough, causes the circuit breaker to open.

Also known is a ground fault protective system comprising a differential transformer having a toroidal core through which each of two line conductors and a neutral conductor pass to form primary windings of at least one turn. The secondary winding of the transformer serves as an output winding and is connected to a ground fault interrupter circuit which energizes the trip coil of a circuit breaker having a plurality of contacts connected to the conductors of the distribution circuit. The protective system further includes pulse generator means coupled to the neutral conductor for producing a high frequency current therein upon grounding of the neutral conductor between the differential transformer and the load. The high frequency current is produced by the periodic firing of a diac when the voltage on a capacitor connected thereto reaches a certain level. Thus, a continuous train of voltage pulses is applied to a winding of an output transformer and these pulses induce voltage pulses in the neutral conductor which passes through the transformer core. The voltage pulses induced on the neutral conductor have no effect upon the current balance in the distribution system as long as the neutral conductor is not grounded on the load side of the transformer. When such grounding does occur, the voltage pulses produce a current in the neutral conductor which does not appear in either of the line conductors. This imbalance is detected by the ground fault sensing means and causes the contacts to open, interrupting the flow of current in the distribution system.

Another known arrangement discloses an electric circuit breaker including highly sensitive ground fault responsive means for protecting human life from electrical shock. Reference is made to the fact that prior art electric circuit breakers were not suitable for protecting human life which protection requires the detection of fault currents on the order of 3 to 50 milliamperes with load currents ranging on the order of 10 to 100 amperes. Sensitivity adequate to protect against ground faults is achieved by a circuit breaker comprising highly sensitive ground fault responsive means including a differential transformer having a toroidal core fabricated of a magnetic material. A line conductor and a neutral conductor pass through the opening in the toroidal core, forming single turn primary windings. The differential transformer also includes a secondary winding comprising a plurality of turns wound on the toroidal core. This secondary winding is connected to the remainder of the ground fault responsive means which includes a solenoid assembly comprising an armature, an operating coil, and a frame mounted on a casing. The armature is adapted for movement between an extended position and a retracted position in response to energization of the operating coil. A latch hook is attached to the armature and disposed for engaging the armature member of the actuator assembly. Thus, energization of the operating coil causes the latch hook to draw the armature away from a latch member to initiate tripping of the circuit breaker. The highly sensitive ground fault responsive means of this arrangement comprising the aforementioned solenoid assembly is capable of opening the circuit breaker contacts in response to ground fault current on the order of 3 to 5 amperes, and thus is desirable from the standpoint of protecting human life against electrical shock.

Yet another ground fault circuit interrupter comprises a differential transformer connected to an AC source which produces a voltage output when an imbalance in current flow between the power lines connected to the AC source occurs. This AC signal voltage is coupled to a differential amplifier through a coupling capacitor, rectified, current limited, and applied to a gate of an SCR. When the SCR conducts, the winding of a transformer connector across the power line is energized, causing two circuit breaker switches to open. Also provided is a ground fault circuit for closing the switch when the line becomes unbalanced.

Still another known arrangement uses a ground leakage protector including a ground fault release coil controlled by a ground fault detector. The ground fault release coil is normally energized, and is deenergized when a ground fault appears which disables a restraining latch which results in the opening of the circuit breaker.

Yet another known arrangement uses a unitary circuit breaker of the molded case type including, within its casing means sensitive to ground faults, means sensitive to overcurrents, and means sensitive to short circuit currents, all of which act on a common trip latch of the breaker to cause automatic opening. The ground fault sensitive means comprises a current imbalance detecting coil which energizes a tripping solenoid, releasing a normally latched plunger to cause tripping.

Also known is a ground fault protection system that employs a dormant oscillator which is triggered into oscillation to initiate disconnection of the protected distribution circuit upon occurrence of a neutral to ground type of fault.

None of the aforementioned prior art suggests a tripping relay which is not self-contained but rather is mounted in a circuit interrupter.

The instant ground fault circuit interrupter with integrated tripping relay is housed in an enclosure which may be surface mounted to a wall or equipment cabinet or the like and which provides access to the operating control buttons such as test and reset and which can be placed mid-span of the cord run so that the line cord enters at one side while the load cord enters at the other. The entrances to the enclosure provide means to securely grip the cable during assembly and thereafter, means to provide strain relief for both cords and means to accept and retain sealants to seal the cord entrances into the enclosure.

SUMMARY OF THE INVENTION

It is an object of the present invention to provide a ground fault circuit interrupter with a tripping relay integrated into the ground fault circuit interrupter device instead of being self-contained.

It is another object of this invention to provide an enclosure for an electrical device mounted mid-span of a cable run which enclosure grips the line side and load side cables and provides strain relief and sealing at the cable entrances to the enclosure.

This and other objects of the invention are achieved by a ground fault circuit interrupter which comprises a front cover which has necessary bosses, guide slots and screw holes for mounting of all mechanical and electrical elements of the tripping relay, a rear cover serving both as a water resistant enclosure and holding the relay elements in position across the width of the ground fault circuit interrupter housing, and a printed circuit board on which most of the electronic components of the ground fault circuit interrupter are mounted and to which the movable contact arms of the relay are directly attached.

The relay armature is located in place by ribs which are part of the front cover and is trapped in position when the relay coil and frame assembly are pushed over it using guide slots which are part of the front cover. The armature has integral arms extending to each side which have an insulating cam on the end of the arm. This is the actuating means for closing the movable arm contacts.

The enclosure has a front portion and a back portion with cable entrances at its longitudinal ends such that the cables can be inserted into the front portion which portion will retain the enclosure upon the cables. Additional slots in the back portion facilitate assembly of the cables and front cover, which together securely grip the line and load cables. A strain relief further grips the cables to prevent forces applied to the cables outside of the enclosure effecting connections within the enclosure. A sealant can now be inserted through a fill hole between the cable grip and cable strain relief, which form a chamber therebetween, to provide an environmental seal at the cable entrances.

DETAILED DESCRIPTION OF THE INVENTION

Figure 1:
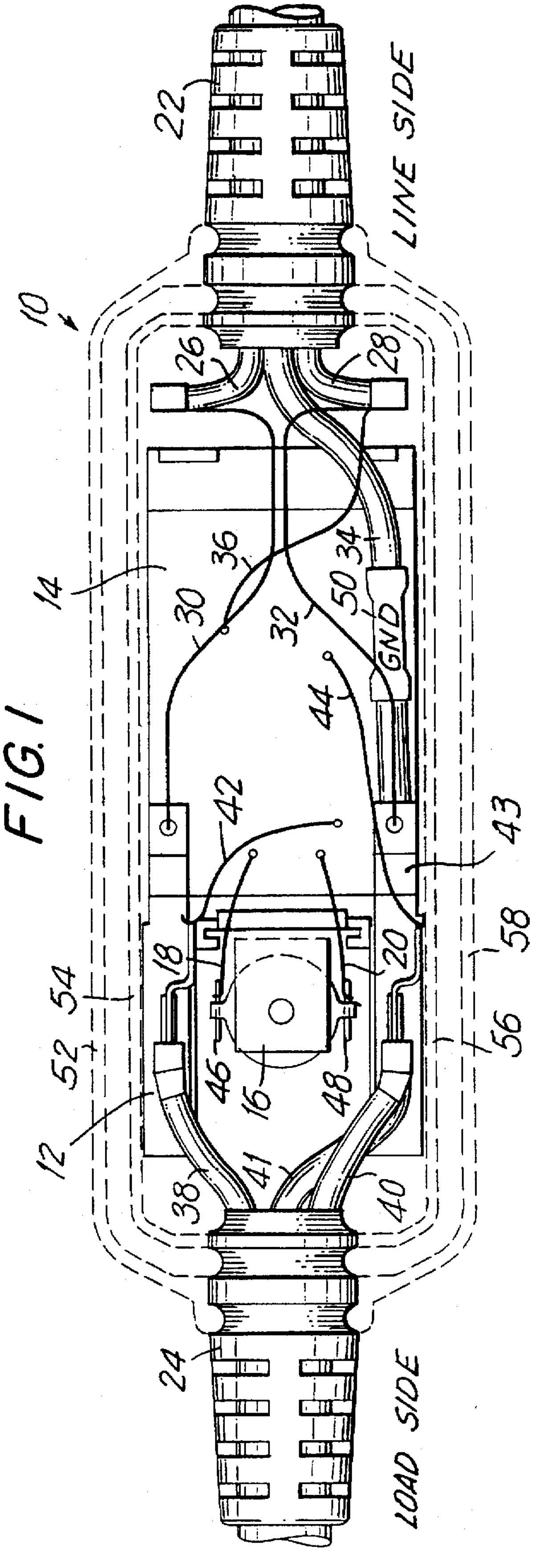
FIG. 1 an elevational sectional view of the ground fault circuit interrupter of the present invention showing the cord and wire assembly therein.

Identical elements are identified by the same reference numerals throughout the application.

As shown in FIG. 1, ground fault circuit interrupter 10 comprises a housing 12 which contains therein a printed circuit board 14 on which the electronic components (not shown) of the GFCI 10 are mounted, as well as a relay 16 whose contact arms are connected to leads 18 and 20 from printed circuit board 14.

GFCI 10 is connected in-line between line connector 22 and load connector 24. The connection from line connector 22 to printed circuit board 14 is made by input cords 26 and 28 which respectively connect to phase wire 30 and ground cord 36 which run directly from line connector 22 to printed circuit board 14. Line to neutral wire 36 is connected from phase wire 30 to ground wire 32. Input ground cord 34 is connected to ground terminal strip 43.

On the load side, output cords 38 and 40 connect load connector 24 to printed circuit board 14 by means of load phase wire 42 and load neutral wire 44, whereas output ground cord 41 functions in analogous fashion to input ground cord 34 in being connected to ground terminal strip 43.

To complete the discussion of FIG. 1, the relay contact arms respectively connected to wires 18 and 20 are designated as 46 and 48, and ground cord 34 has a jacket-type label 50. Possible connections from line connector 22 to load connector 24 which circumvent GFCI 10 are shown by phantom connector lines 52, 54, 56, and 58.

Figure 2:
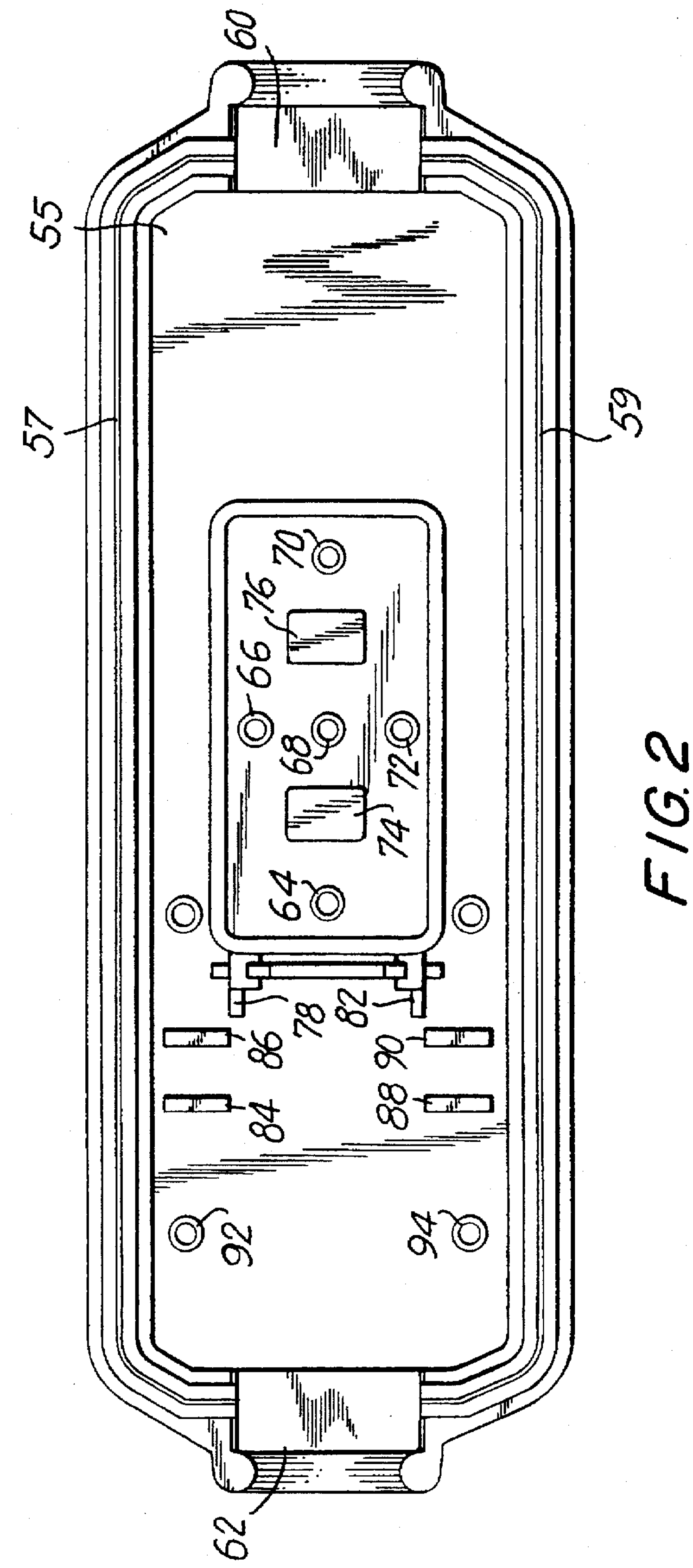
FIG. 2 is an inside elevational view of the front cover of the ground fault circuit interrupter of the present invention.

FIG. 2 shows an internal view of the front cover 55 having respective ridged periphery sections 57 and 59, which respectively terminate at rectangular, stepped flat surfaced sections 60 and 62. Shown therein are a plurality of screw holes 64, 66, 68, 70 and 72, as well as apertures 74 and 76 for mounting printed circuit board 14 thereon. Likewise, ribs 78 and 82, guide slots 84, 86, 88 and 90 and screw holes 92 and 94 serve for mounting of the various mechanical and electrical elements of the tripped relay 16.

The relay armature 108 is located in place by ribs 78–82 and is trapped in position when the relay coil and frame assembly (shown in FIG. 8) is pushed over it using guide slots 84–90 which are part of front cover 55.

Figure 3:
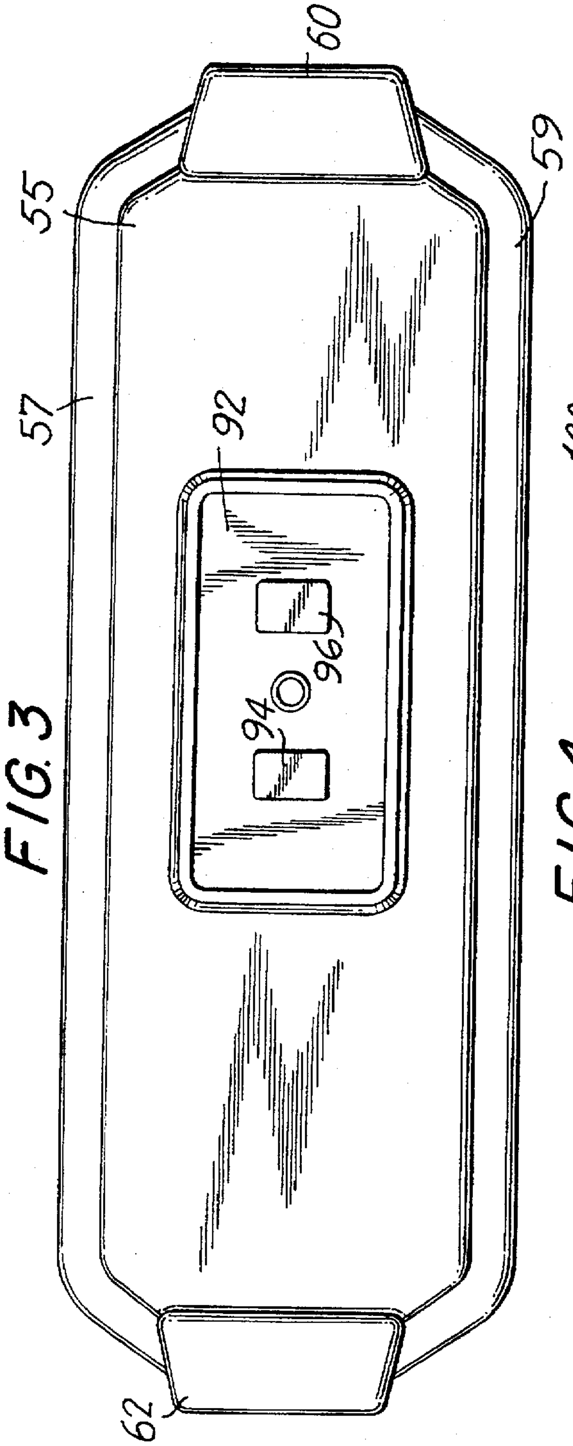
FIG. 3 is an outside elevational view of the front cover of the ground fault circuit interrupter of the present invention.

FIG. 3 shows an external view of the front cover 54 shown in FIG. 2. It contains thereon a test panel 92 having test and reset pushbuttons 94 and 96.

Figure 4:
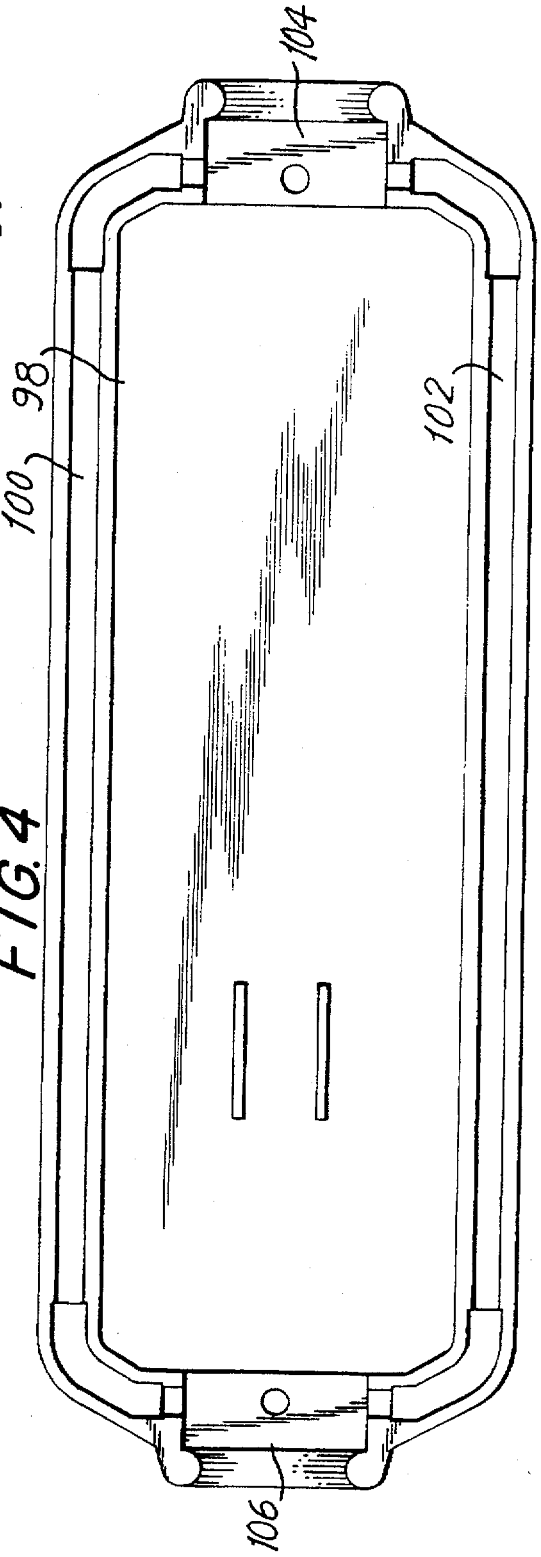
FIG. 4 is an inside elevational view of the rear cover of the present invention.

FIG. 4 shows an internal view of rear cover 98. Ridged peripheral sections 100 and 102 are configured to mate with ridged peripheral sections 57 and 59 of front cover 54, and stepped, flat surfaced sections 104 and 106 are configured to mate with the stepped, flat surfaced sections 60 and 62. Also, rear cover 98 serves as a water resistant enclosure.

Figure 5:
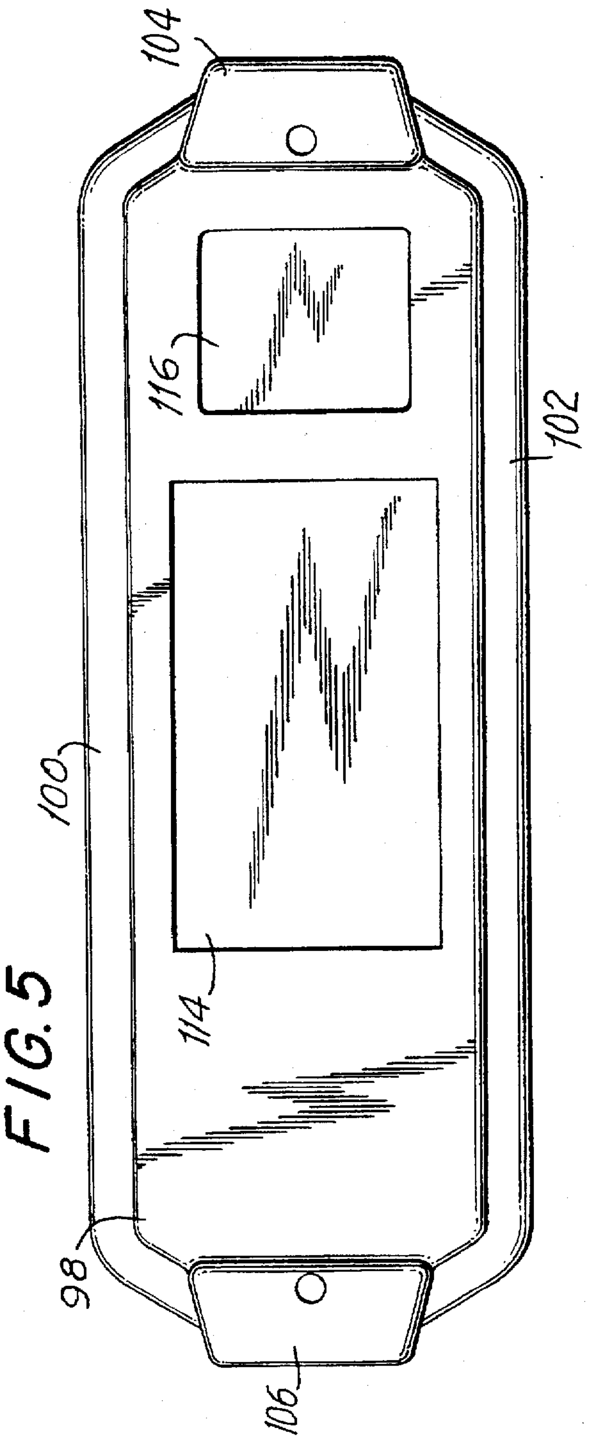
FIG. 5 is an outside elevational view of the rear cover of the present invention.

FIG. 5 is an external view of the cover 98 shown in FIG. 4. The two slightly depressed areas 114 and 116 shown thereon are for the placement of labels.

Figure 6:
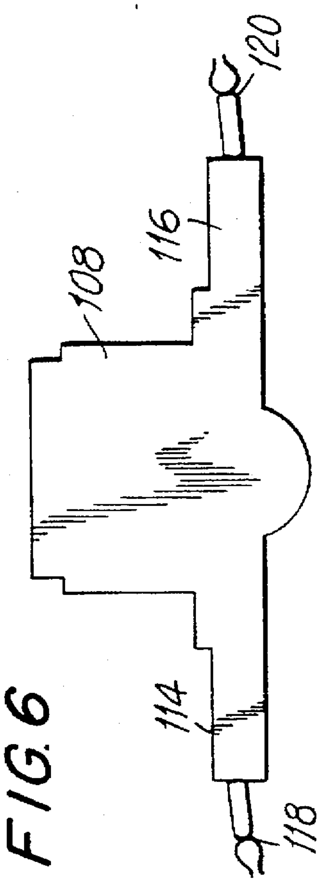
FIG. 6 is an elevational view of the armature of the tripping relay of the ground fault circuit interrupter of the present invention.

FIG. 6 is an elevational view of the armature 108 of the tripping relay 16 of the present invention. As shown therein, armature 108 has integral arms 114 and 116 extending to each side which have an insulating cam 118, 120 on the end of each arm. This is the actuating means for closing the movable arm contacts of tripping relay 16.

Figure 7:
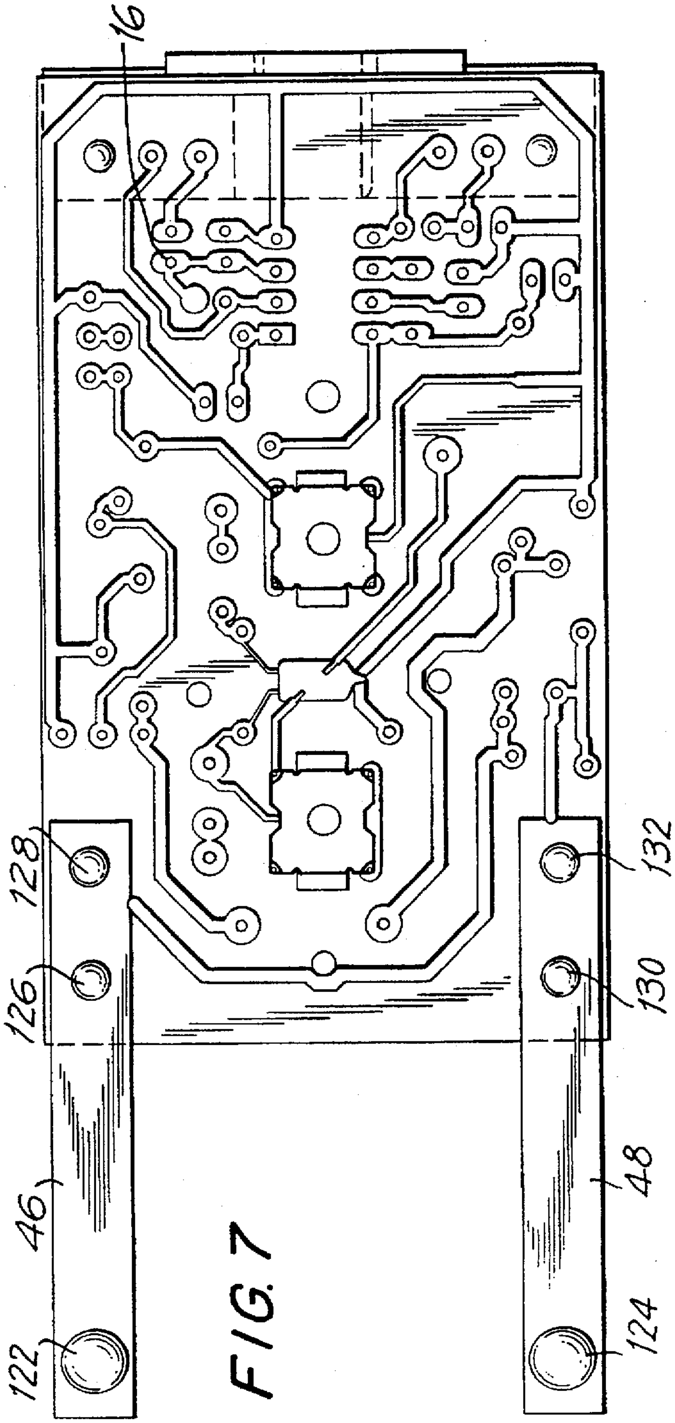
FIG. 7 is a top view showing the connection of the contact arms of the relay to the printed circuit board of the ground fault circuit interrupter of the present invention.

FIG. 7 shows that the relay contact arms 46 and 48 respectively having contacts 122 and 124 respectively mounted thereon are connected directly by means of screws 126, 128, 130 and 132 to printed circuit board 16.

Figure 8B:
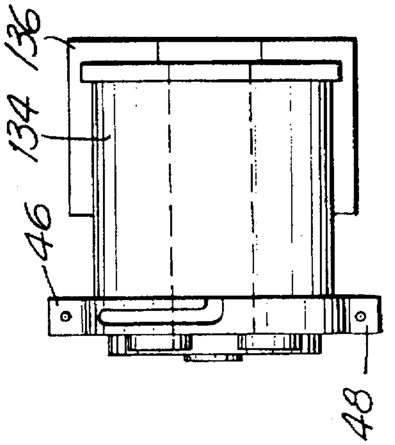
FIGS. 8*a* and 8*b* are an assembly drawing showing the tripped relay coil and frame which are part of the ground fault circuit interrupter of the present invention.
Figure 8A:
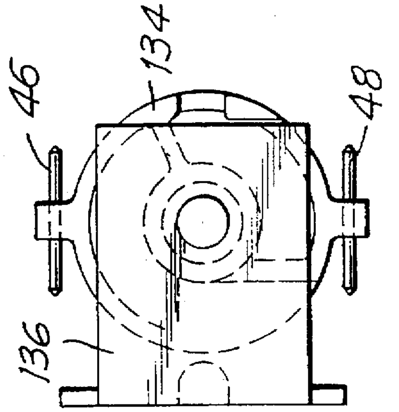

FIGS. 8*a* and 8*b* show relay coil 134 and contact arms 46 and 48 which, together with mounting bracket 136, constitute the elements which are made an integral part of the ground fault circuit interrupter 10 instead of being self-contained as had been the case in the prior art.

Figure 9:
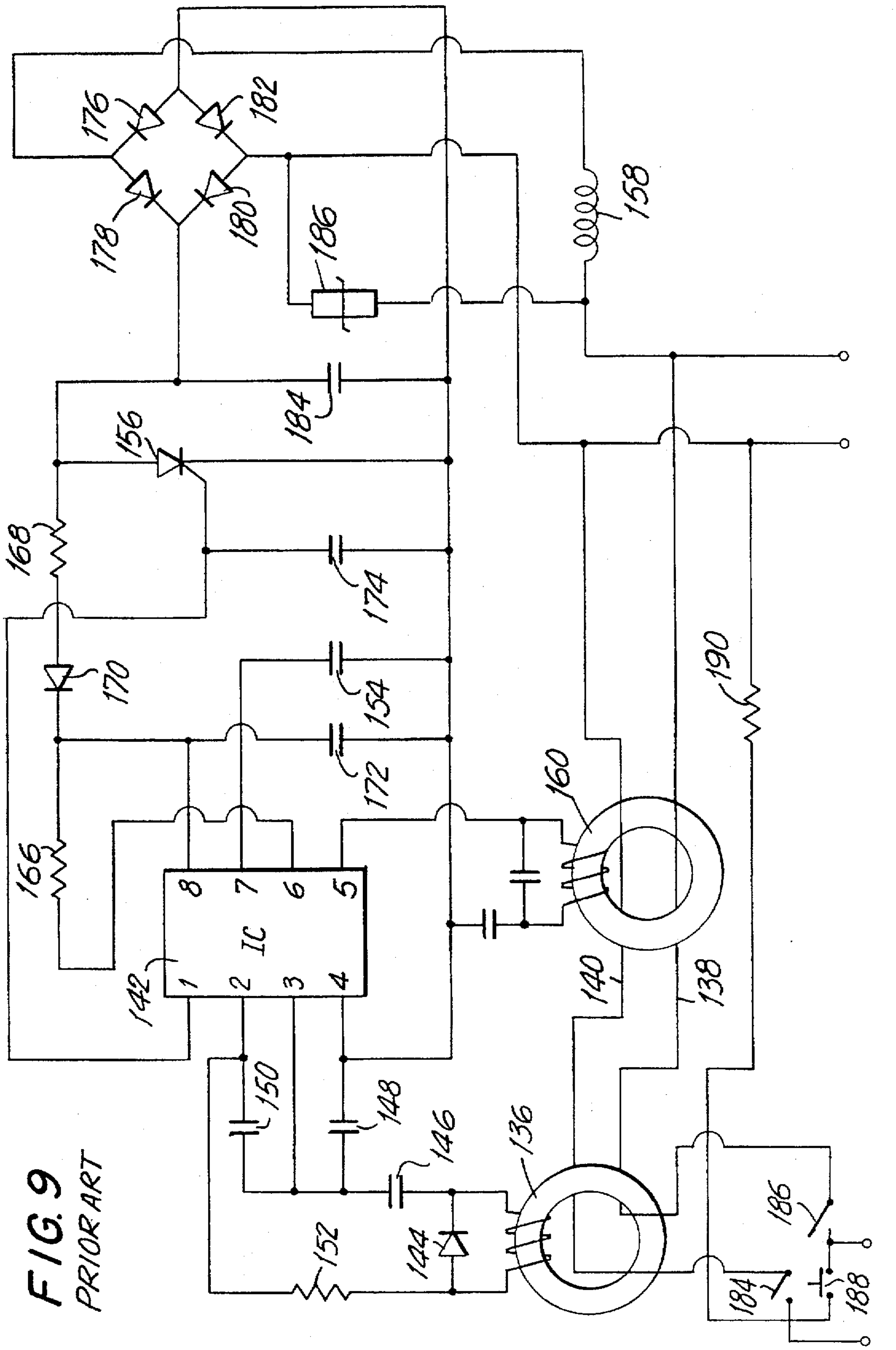
FIG. 9 PRIOR ART
FIG. 9 is a prior art schematic drawing the circuitry of a ground fault circuit interrupter.

FIG. 9 describes a prior art GFCI circuit. This circuit operates in the following manner:

Differential transformer 136 monitors the flow of current in the line and neutral conductors and produces in its secondary a fault signal when the total current in the line conductor or conductors 138 does not equal the current in the neutral conductor 140. The output from the secondary of differential transformer 136 is conveyed to integrated circuit 142 through diode 144, capacitors 146, 148 and 150, and resistor 152. Integrated circuit 142 may be a type NL 1851 Ground Fault Interrupter manufactured by National Semiconductor Corporation.

A salient feature of the above circuit is the combination of diode 144 and resistor 152 which are arranged so as to promote quick discharge of capacitor 146. This discharge of capacitor 146 allows for integrated circuit 142 to be kept continuously energized and thus considerably reduces the time required for detection of a fault. This continuous energization of integrated circuit 142 from the line side was not possible in the earlier arrangements wherein power to the integrated circuit had to be brought from the load side or an auxiliary switch had to be employed so that the integrated circuit could only function intermittently. The reason for this is that capacitor 154, which is attached to output pin 7 of integrated circuit 142, and which basically controls the trip circuit, would otherwise cause SCR 156 to fire frequently, thus frequently energizing trip coil 158 and causing the possibility of trip coil burnout.

On a neutral to ground fault the system functions somewhat similarly in that transformer 160, which together with differential transformer 136 forms part of the induction coil, has a signal induced on its secondary windings which is carried through capacitors 146 and 148 to input pin 4 of integrated circuit 142.

The trip circuit for both types of faults is identical in that, if a fault is detected by the input pins 2, 3, and 4 of IC 142, a signal is output from pin 7 of integrated circuit 142 causing capacitor 154 to charge faster. At the same time, the path to the gate of SCR 156 including resistors 166 and 168, diode 170, and capacitors 172 and 174, is energized. SCR 156 then conducts and an energization path to trip coil 158 is created through the diode bridge containing diodes 176, 178, 180 and 182. Capacitor 184 and MOV 186 are present for surge protection.

Upon energization of trip coil 158 due to a line to ground fault, contacts 100 and 102 of the ground fault circuit interrupter are opened which respectively open lines 138 and 140.

A pushbutton 188 and resistor 190 are part of a test circuit which bypasses the transformers 136 and 160. Also, since the ground fault circuit interrupter is only sensitive to differences in current flow between the "hot" conductors and the neutral conductor or the neutral conductor and ground, unbalanced loading between "hot" conductors will not cause "nuisance" tripping.

Figure 10:
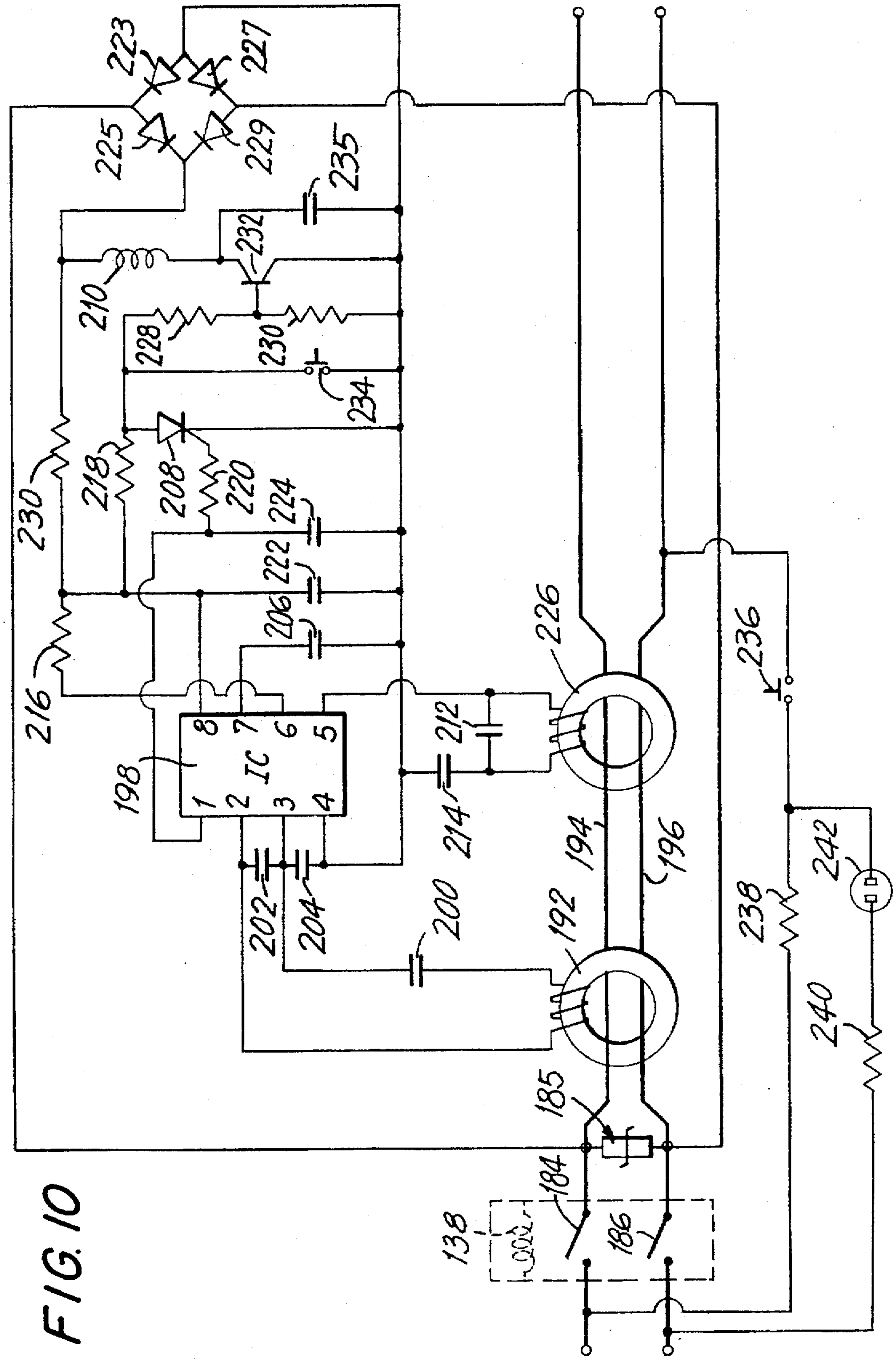
FIG. 10 is a schematic drawing of the circuitry of the ground fault circuit interrupter of the present invention.
Figure 11:
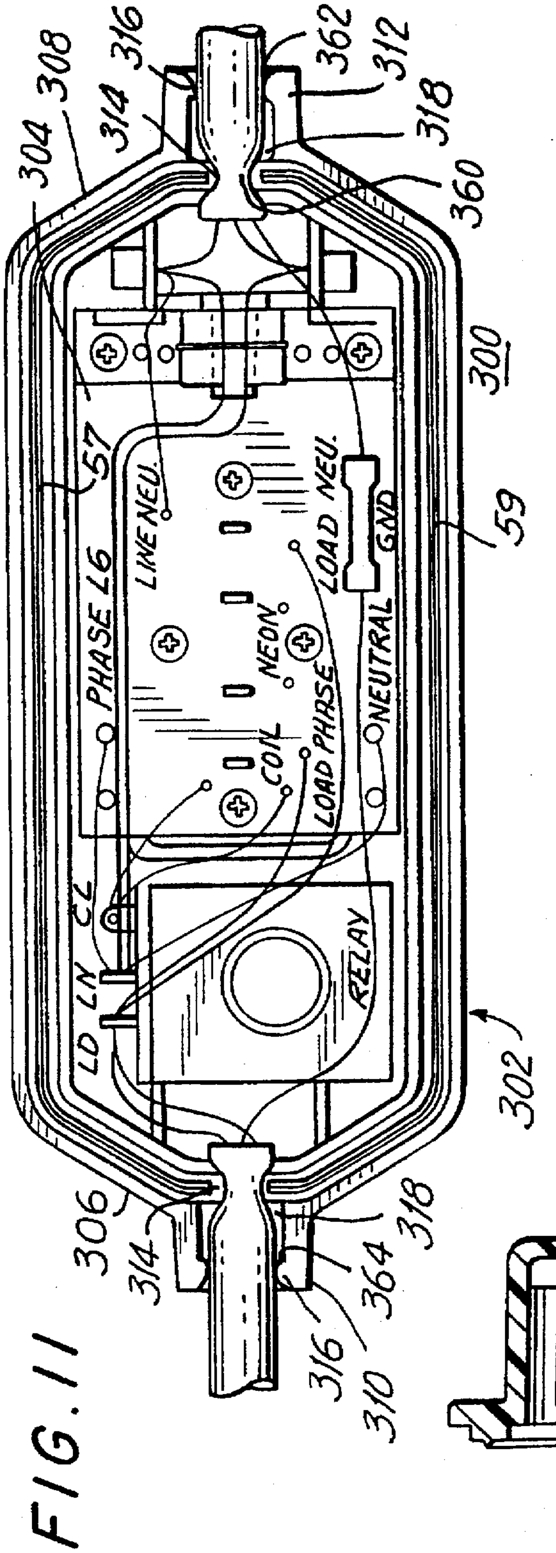
FIG. 11 is a top plan view of the inside of the front cover of an enclosure constructed in accordance with the concepts of the invention.
Figure 13:
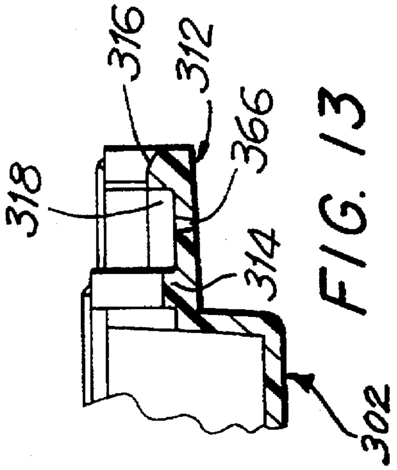
FIG. 13 is a fragmentary front elevational view, partially in section, of the cord entrances to the enclosure located in the front cover.
Figure 12:
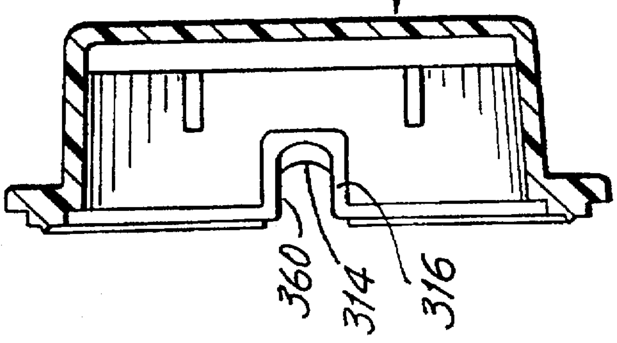
FIG. 12 is an end view, partially in section, of the enclosure of FIG. 11.
Figure 14:
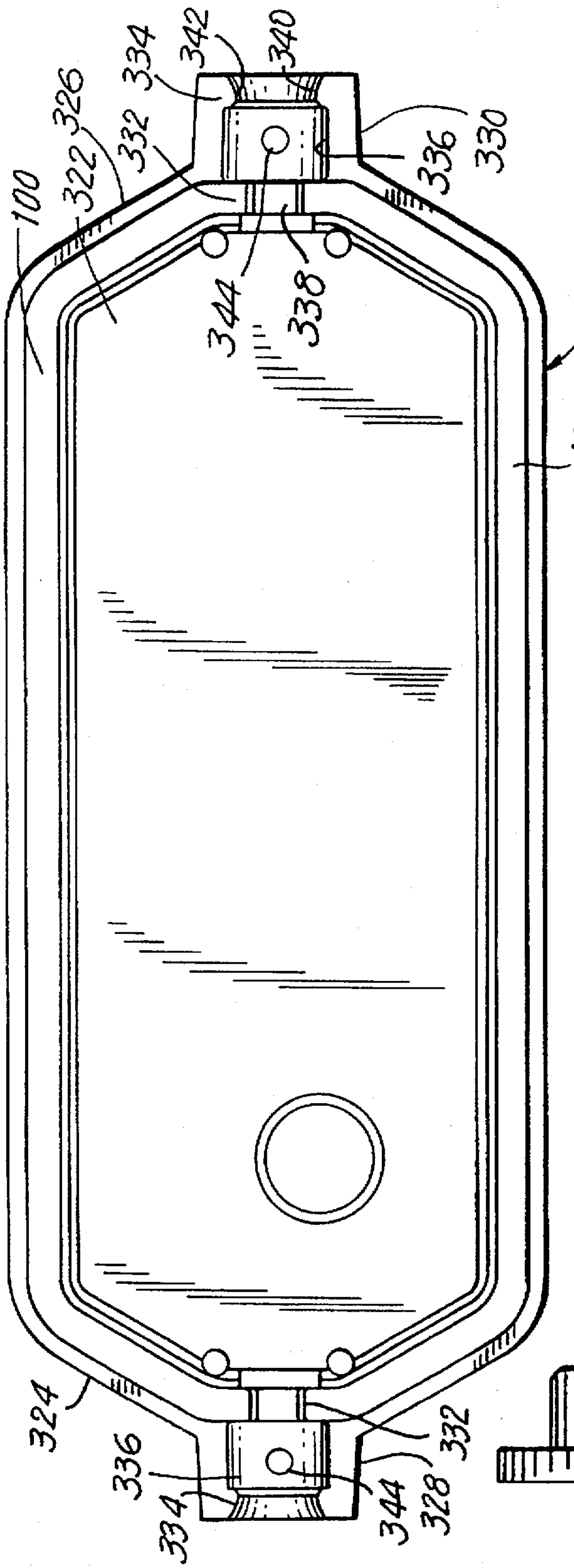
FIG. 14 is a top plan view of the inside of the back cover.
Figure 16:
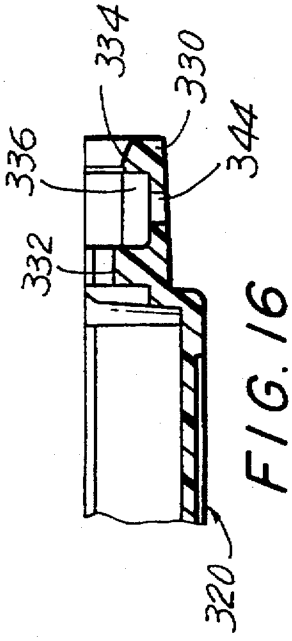
FIG. 16 is a fragmentary, front elevational view, partially in section, of the cord entrances to the enclosure located in the back cover.

FIG. 10 is a schematic of the ground fault circuit interrupter of the present invention. The operation of this circuit is somewhat similar to that shown in FIG. 9. As shown therein, differential transformer 192 monitors the flow of current in the line and neutral conductors and produces in its secondary a fault signal when the total current in the line conductor or conductors 194 does not equal the current in the neutral conductor 196.

The output from the secondary of differential transformer 192 is conveyed to integrated circuit 198 through capacitors 200, 202, and 204. Integrated circuit 198 may be a type of ground fault interrupter "chip" manufactured by a number of companies. The circuit is arranged so that quick discharge of capacitor 200 is promoted, thus allowing for integrated circuit 198 to be kept continuously energized and consequently reducing the time required for detection of a fault. This continuous energization of integrated circuit 198 from the line side was not possible in some earlier arrangements wherein power to the integrated circuit had to be brought from the load side or an auxiliary switch had to be employed so that the integrated circuit could only function intermittently. The problem with this intermittent function would be that capacitor 206, which is attached to output 7 of integrated circuit 198, and which basically controls the trip circuit, would otherwise cause SCR 208 to fire frequently, thus frequently energizing trip coil 210 and causing the possibility of trip coil burn out.

On a neutral to ground fault the system functions somewhat similarly in that transformer 212, which together with differential transformer 198 forms part of an induction coil, has a signal induced on its secondary windings which is carried through capacitors 212 and 214 to input pin 4 of integrated circuit 198.

The trip circuit for both types of faults is identical in that, if a fault is detected by the input pins 2, 3, and 4 of IC 198, a signal is output from pin 7 of integrated circuit 198 causing capacitor 206 to charge faster. At the same time the path to the gate of SCR 208 including resistors 216, 218, 220, and 230, as well as capacitors 222 and 224, is energized.

SCR 208 then conducts and sends a signal through resistors 228 and 230 to the gate of transistor 232 which then conducts an energization path to trip coil 210 as created including capacitor 235 and diode bridge 223, 225, 227, and 229. Metal oxide varistor 185 provides a voltage input to the diode bridge.

As to the trip circuit, when trip coil 210 is energized, a signal is sent to relay coil 134 which then uses its contacts 184 and 186 to open lines 194 and 196.

A reset pushbutton 234 is also provided. A test circuit which bypasses transformers 192 and 226 comprises test pushbutton 236, resistors 238 and 240 and neon light 242. Also, since the ground fault circuit interrupter is only sensitive to differences in current flow between the hot conductors and the neutral conductor or the neutral conductor and ground, unbalanced loading between "hot" conductors will not cause "nuisance" tripping.

Turning now to FIGS. 11 to 16, there is shown an improved housing or enclosure 300 for electrical devices which are to be mounted mid-span of a cable or cord run. The enclosure 300 may be made of insulating plastic, rubber or the like employed to contain and protect a ground fault circuit interrupter with tripping relay as described herein, a switch assembly, receptacles, test devices or the like. Except that the front and rear covers may have specific apertures and slots to accommodate the electrical devices to be contained therein and the various mounting posts and apertures to mount and anchor such devices, the enclosures are substantially the same.

The enclosure 300 is generally rectangular, having a longitudinal length greater than its transverse width with the end faces tapered to the cable or cord entrances. Enclosure 300 is made up of a front cover 302 which may have suitable apertures to receive push buttons such as 94 and 96 of FIG. 3 (not shown) and a rear cover 320 which may have mounting holes or the like. The interior surface 304 of the front cover 302 and interior surface 322 of rear cover 320 may have appropriate mounting posts, bosses or other means to support and anchor electrical devices contained therein.

Ridged peripheral sections 100 and 102 on the back cover 320 mate with similarly configured ridged peripheral sections 57 and 59 of the front cover 302 as described above with respect to FIGS. 2 and 4. The end faces 306, 308 on front cover 302 as well as end faces 324, 326 of back cover 320 taper towards the longitudinal axis of enclosure 300 but end at cable or cord entrances 310, 312 on end faces 306, 308 of front cover 302 and cable or cord entrances 328, 330 on end faces 324, 326, respectively, of rear cover 320.

Cord entrances 310, 312 each have gripping jaws 314 and strain relief ribs 316 with a chamber 318 between them. Cord entrances 328, 330 each have a gripping jaw 332 and strain relief ribs 334 with a chamber 336 between them. A recess 360 is placed in gripping jaws 314 and a recess 338 is placed in jaws 332. When the front cover 302 and rear cover 320 are assembled together the cord gripping jaws 314 and 332 as well as the strain relief ribs 316 and 334 will each form a complete annular ring about the interior of the cord entrances 310, 312, 328, 330. Also the chambers 318 and 336 will form one continuous chamber about the entire interior of the cord entrances 310, 312, 328 and 330, respectively.

Figure 15:
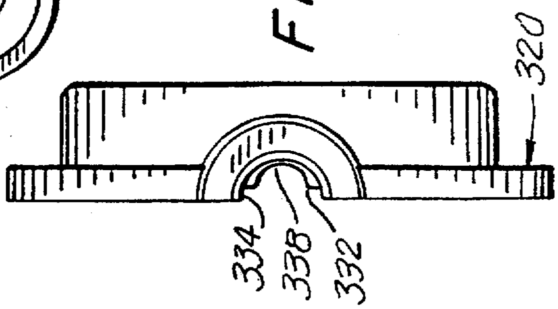
FIG. 15 is an end view of the back cover of FIG. 14.

The recesses 314 placed in cord entrances 310, 312 of front cover 302 (see FIG. 12) are far deeper than the recesses 338 in cord entrances 328, 330 of rear cover 320 (see FIG. 15). The recesses 314 permit the adjacent jaws 314 to firmly grip an inserted cord (not shown) so that work can be done on the electrical devices mounted to front cover 302 without having to separately maintain the enclosure 300 on the cords. The recess 338 being less deep makes assembly of the front cover 302 to the rear cover 320 easier and require less force than if the cords had to be forced into deeper recesses. The continuous rib thus formed by gripping jaws 314 and 332 securely grip the cords inserted into enclosure 300.

The continuous rib formed by strain relief ribs 316, 334 also securely grip the cords inserted into the enclosure 300. The entry portions 362, 340 are tapered so that the cords can be flexed to a limited degree about the cord entrances 310, 312, 328 and 330 without damage to such cords. The sharp edges 364, 342 of the strain relief ribs 316, 334 dig into the cord insulation to prevent any forces applied to the cords to be transferred to the cord connections within the enclosure thus separating the cord conductors from their terminations within enclosure 300.

To seal the cord entrances 310, 312, 328 and 330 a sealant such RTV compound may be employed. An aperture 344 is provided in each cord entrance 328, 330 through which the RTV compound may be introduced using a suitable fitting (not shown). To allow the trapped air to be removed as the RTV compound is introduced, each of the cord entrances 310, 312 are provided with a much smaller vent hole 366 to permit the trapped air to escape but limit the escape of any of the RTV compound.

Once assembled and with the sealant applied, the enclosure 300 provides an ideal enclosure for electrical devices to which are attached a line cord and a load cord which provides means to grip and strain relieve such cords while sealing their entrance to the enclosure from the surrounding environment.

The embodiments of the invention disclosed and described in the present specification and drawings and claims are presented merely as examples of the invention. Other embodiments, forms and modifications thereof will suggest themselves from a reading thereof and are contemplated as coming within the scope of the present invention.

What is claimed is:

1. An enclosure for an electrical device to be mounted in a line between a line cord and a load cord comprising:

a) an elongate front cover having a first end and a second end and an integral first partial cord entrance at said first end and an integral second partial cord entrance at said second end;

b) an elongate rear cover having a third end and a fourth end and an integral third partial cord entrance at said third end and an integral fourth partial cord entrance at said fourth end;

c) said front cover and said rear cover when assembled together providing environmental protection for said electrical device placed between said front and said rear covers;

d) said first and third integral partial cord entrances forming an integral first complete cord entrance when said front and said rear covers are assembled;

e) said second and fourth partial cord grip entrances forming an integral second complete cord entrance when said front cover and said rear cover are assembled:

f) said front cover having a first cord gripping jaw spaced from said first end and a second cord gripping jaw spaced from said second end;

g) said rear cover having a third cord gripping jaw spaced from said third end and a fourth cord gripping jaw spaced from said fourth end;

h) said first and third cord gripping jaws forming a first complete cord grip when said front cover and said rear cover are assembled;

i) said second and fourth cord gripping jaws forming a second complete cord grip when said front cover and said rear cover are assembled;

j) said first and said second complete cord grips each being able to securely grip one of said line cord and said load cord;

k said front cover having a first strain relief rib on the interior thereof at said first end;

l said rear cover having a second strain relief rib on the interior thereof at said third end;

m said front cover and said rear cover when assembled forming a complete strain relief from said first and second strain relief ribs, said complete strain relief being spaced apart from said first complete cord grip providing a first chamber therebetween for receipt therein of a sealant.

2. An enclosure as defined in claim 1, wherein said first chamber has a first aperture in said rear cover for the introduction of a sealant therethrough to fill said first chamber.

3. An enclosure as defined in claim 2, wherein said first chamber has a second aperture in said front cover to permit the escape of trapped air when said sealant is introduced into said first chamber.

4. An enclosure for an electrical device to be mounted in a line between a line cord and a load cord comprising:

a) an elongate front cover having a first end and a second end and an integral first partial cord entrance at said first end and an integral second partial cord entrance at said second end;

b) an elongate rear cover having a third end and a fourth end an integral third partial cord entrance at said third end and an integral fourth partial cord entrance at said fourth end;

c) said front cover and said rear cover when assembled together providing environmental protection for said electrical device placed between said front and said rear covers;

d) said first and third integral partial cord entrances forming an integral first complete cord entrance when said front and said rear cover are assembled:

e) said second and fourth partial cord grip entrances forming an integral second complete cord entrance when said front cover and said rear cover are assembled;

f) said front cover having a first cord gripping jaw spaced from said first end and a second cord gripping jaw spaced from said second end;

g) said rear cover having a third cord gripping jaw spaced from said third end and a fourth cord gripping jaw spaced from said fourth end;

h) said first and third cord gripping jaws forming a first complete cord grip when said from cover and said rear cover are assembled;

i) said second and fourth cord gripping jaws forming a second complete cord grip when said front cover and said rear cover are assembled;

j) said first and said second complete cord grips each being able to securely grip one of said line cord and said load cord:

k said front cover having a first strain relief rib on the interior thereof at said first end and a second strain relief rib on the interior of said front cover at said second end;

l said rear cover having a third strain relief rib on the interior thereof at said third end and a fourth strain relief rib on the interior of said rear cover at said fourth end;

m said front cover and said rear cover when assembled forming a first complete strain relief from said first and third strain relief ribs, said first complete strain relief spaced apart from said first complete cord grip to provide a first chamber therebetween for receipt of a sealant and forming a second complete strain relief from said second and fourth strain relief fibs, said second complete strain relief spaced apart from said second complete cord grip to provide a second chamber therebetween for the receipt of a sealant.

5. An enclosure as defined in claim 4, wherein said first and said second chambers each have a first aperture in said rear cover for the introduction of a sealant therebetween to fill said first and said second chambers.

6. An enclosure as defined in claim 5, wherein said first and said second chambers each have a second aperture in said front cover to permit the escape of air when said sealant is introduced into said first and second chambers.

* * * * *